United States Patent
Nonaka et al.

(10) Patent No.: US 8,398,308 B2
(45) Date of Patent: Mar. 19, 2013

(54) DISK DRIVE DEVICE PROVIDED WITH FLUID DYNAMIC BEARING UNIT

(75) Inventors: Taketo Nonaka, Shizuoka (JP); Toshiki Maeda, Shizuoka (JP)

(73) Assignee: Alphana Technology Co., Ltd., Shizuoka (JP)

(*) Notice: Subject to any disclaimer, the term of this patent is extended or adjusted under 35 U.S.C. 154(b) by 348 days.

(21) Appl. No.: 12/815,289

(22) Filed: Jun. 14, 2010

(65) Prior Publication Data

US 2011/0007989 A1 Jan. 13, 2011

(30) Foreign Application Priority Data

Jul. 13, 2009 (JP) ................................. 2009-164831

(51) Int. Cl.
*F16C 32/06* (2006.01)
*F16C 33/74* (2006.01)

(52) U.S. Cl. ......... 384/107; 384/118; 384/130; 384/132

(58) Field of Classification Search .................. 384/100, 384/107, 114, 117, 118, 130, 131, 132
See application file for complete search history.

(56) References Cited

U.S. PATENT DOCUMENTS

| | | | | |
|---|---|---|---|---|
| 5,667,309 A | * | 9/1997 | Nose | 384/132 |
| 5,765,952 A | * | 6/1998 | Dekker et al. | 384/132 |
| 6,657,342 B2 | * | 12/2003 | Kodama | 310/90 |
| 7,625,123 B2 | * | 12/2009 | Ishikawa et al. | 384/100 |
| 2005/0111766 A1 | * | 5/2005 | Gotoh et al. | 384/100 |
| 2008/0037915 A1 | * | 2/2008 | Obara | 384/100 |
| 2009/0063764 A1 | * | 3/2009 | Hendriks et al. | 711/112 |

FOREIGN PATENT DOCUMENTS

JP 2002-266852 9/2002

* cited by examiner

*Primary Examiner* — James Pilkington
*Assistant Examiner* — Adam D Rogers
(74) *Attorney, Agent, or Firm* — Fulwider Patton LLP (57) ABSTRACT

A bearing unit for a disk drive device is formed by a sleeve concave portion and a shaft concave portion, and is provided with a capillary seal portion in which the gap between the sleeve concave portion and the shaft concave portion is increased in diameter toward the hub side of the sleeve. Assuming that: the outer circumferential diameter at the tilt starting end on the base member side of the shaft concave portion is D0; the inner circumferential diameter at the tilt starting end on the hub side of the sleeve concave portion is D1; the facing outer circumferential diameter of the shaft concave portion, which faces, in the radial direction, the inner circumference at the tilt starting end of the sleeve concave portion, is D2; and the diameter of the most concave inner circumference of the sleeve concave portion is D3, D2 is smaller than D0, D3 is larger than D1, and the difference between D3 and D0 is larger than that between D0 and D2.

14 Claims, 6 Drawing Sheets

DISK DRIVE DEVICE PROVIDED WITH FLUID DYNAMIC BEARING UNIT

CROSS-REFERENCE TO RELATED APPLICATION

This application is based upon and claims the benefit of priority from the prior Japanese Patent Application No. 2009-164831, filed on Jul. 13, 2009, the entire content of which is incorporated herein by reference.

BACKGROUND OF THE INVENTION

1. Field of the Invention

The present invention relates to a disk drive device that rotationally drives a disk.

2. Description of the Related Art

In recent years, disk drive devices such as HDDs (Hard disk drives) have been dramatically improved in rotational accuracy by being provided with fluid dynamic bearings, and therefore those with high density and large capacity can be available. Due to this, disk drive devices provided with fluid dynamic bearings have been mounted in a wide variety of apparatuses. Accordingly, the disk drive devices have been used in various environments.

For example, a spindle motor is disclosed in Japanese Patent Application Publication No. 2002-266852, in which a first taper surface having a taper angle of θ1 is formed on the outer circumferential surface of a shaft and a second taper surface having a taper angle of θ2 is formed on the inner circumferential surface of a sleeve, and the taper angles θ1 and θ2 have a relationship of θ1>θ2.

It is demanded that a disk drive device exhibits high reliability even if the shaft thereof is maintained in a horizontal state in order to enhance freedom in the arrangement of the disk drive device. That is, a disk drive device having the following characteristics is demanded, namely, even if an impact is applied to a disk drive device when the shaft thereof is maintained in a horizontal state: the disk drive device is stable; read/write of magnetic data can be normally performed; and the lifetime of the disk drive device will not be shortened.

There is a phenomenon in which, if a disk drive device provided with a fluid dynamic bearing unit is used when the shaft thereof is maintained in a horizontal state, the lifetime of the disk drive device will be shortened in comparison with the case where a disk drive device provided with the same fluid dynamic bearing unit is used when the shaft thereof is maintained in a vertical state. In particular, the lifetime of a disk drive device will be sometimes significantly shortened if an impact is applied thereto when the shaft thereof is maintained in a horizontal state. Accordingly, the present inventor has acquired the following knowledge after studying on the mechanism by which these phenomena occur.

When the amount of the lubricant in a fluid dynamic bearing unit is decreased, the function as a bearing is deteriorated and the rotation of the fluid dynamic bearing unit becomes unstable. When operations of reading/writing magnetic data are not performed normally, the lifetime of the disk drive device will be shortened. If a disk drive device is used when the shaft thereof is maintained in a horizontal state, the gas-liquid interface of the lubricant is tilted due to gravity. If the tilt angle of the gas-liquid interface of the lubricant is large, the contact area of the lubricant with air is increased and the amount of the lubricant is decreased at a rapid pace due to evaporation, thereby the lifetime thereof being shortened.

In addition, part of the tilted lubricant is to be closer to the opening of a fluid dynamic bearing unit, causing the fear that the lubricant may be dispersed outside the fluid dynamic bearing unit even when a small impact is applied thereto. When the amount of lubricant is decreased after the lubricant has been dispersed outside a fluid dynamic bearing unit, the lifetime of the fluid dynamic bearing will be shortened.

SUMMARY OF THE INVENTION

The present invention has been made in view of these situations, and a purpose of the invention is to provide a disk drive device in which, when a shaft of the disk drive device that is provided with a fluid dynamic bearing unit is maintained in a horizontal state, a loss in the amount of the lubricant is reduced and shortening of the lifetime of the disk drive device is suppressed. In order to solve the aforementioned problems, a disk drive device according to an embodiment of the invention comprises: a base member; a bearing unit that is provided on the base member and is configured such that a shaft and a sleeve in which the shaft is inserted rotate relatively to each other; and a hub that is supported via the bearing unit. The bearing unit includes: the shaft to be the center of the rotation; a radial dynamic pressure groove that is provided on at least one of the inner circumferential surface of the sleeve and the outer circumferential surface of the shaft in order to generate radial dynamic pressure in lubricant; a sleeve concave portion that is formed on the inner circumferential surface at the end portion on the hub side of the sleeve; and a capillary seal portion that is formed by the sleeve concave portion and a shaft concave portion formed on the outer circumferential surface of the shaft, the outer circumferential surface facing the sleeve concave portion, and the gap between the sleeve concave portion and the shaft concave portion is formed so as to expand toward the hub side of the sleeve. In this disk drive device, assuming that: the outer circumferential diameter at the tilt starting end on the base member side of the shaft concave portion is D0; the inner circumferential diameter at the tilt starting end on the hub side of the sleeve concave portion is D1; the facing outer circumferential diameter of the shaft concave portion, which faces, in the radial direction, the inner circumference at the tilt starting end of the sleeve concave portion, is D2; and the diameter of the most concave inner circumference of the sleeve concave portion is D3, D2 is smaller than D0, D3 is larger than D1, and the difference between D3 and D0 is larger than that between D0 and D2.

According to the embodiment, when a shaft is maintained in a horizontal state, the tilt of the gas-liquid interface of the lubricant in a capillary seal portion can be alleviated and a loss in the amount of the lubricant can be reduced, thereby allowing for shortening of the lifetime to be suppressed.

Another embodiment of the present invention also relates to a disk drive device. The device comprises: a base member; a bearing unit that is provided on the base member and is configured such that a shaft and a sleeve in which the shaft is inserted rotate relatively to each other; and a hub that is supported via the bearing unit. The bearing unit includes: the shaft to be the center of the rotation; a radial dynamic pressure groove that is provided on at least one of the inner circumferential surface of the sleeve and the outer circumferential surface of the shaft in order to generate radial dynamic pressure in lubricant; a sleeve concave portion that is formed on the inner circumferential surface at the end portion on the hub side of the sleeve; and a capillary seal portion that is formed by the sleeve concave portion and a shaft concave portion formed on the outer circumferential surface of the shaft, the outer circumferential surface of the shaft facing the sleeve concave portion, and the gap between the sleeve concave portion and the shaft concave portion is formed so as to expand toward the hub side of the sleeve. The disk drive device is configured such that, even if an acceleration of 450 G is applied thereto for a period of 2 ms when the axial direction of the shaft is maintained in a horizontal state, the lubricant in the capillary seal portion is held.

According to the embodiment, a loss in the amount of the lubricant in a capillary seal portion can be reduced, thereby allowing for shortening of the lifetime to be suppressed.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

The same or equivalent constituting elements and members illustrated in each drawing shall be denoted by the same reference numerals, and duplicative explanations will be omitted appropriately. Dimensions of members illustrated in each drawing are appropriately enlarged or reduced for ease of understanding.

A disk drive device according to an embodiment is suitable for a disk drive device that is mounted in a hard disk drive to drive a magnetic recording disk, and for a disk drive device that is mounted in an optical disk recording and reproducing device, such as a CD (Compact Disc) device or a DVD (Digital Versatile Disc) device.

Figure 1A:
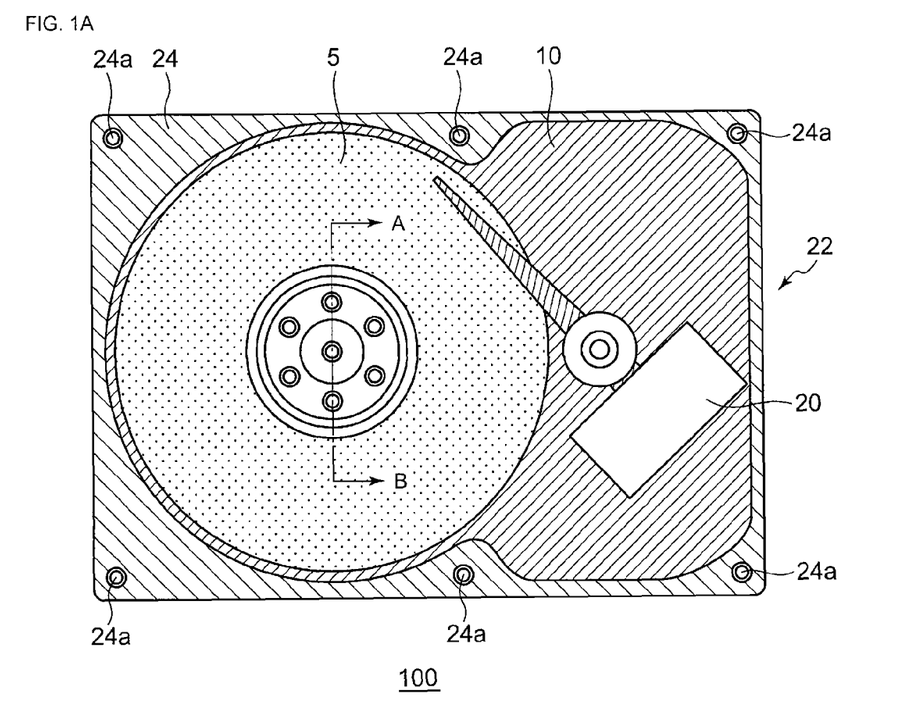
FIGS. 1A and 1B are views illustrating a disk drive device according to an embodiment.
Figure 1B:
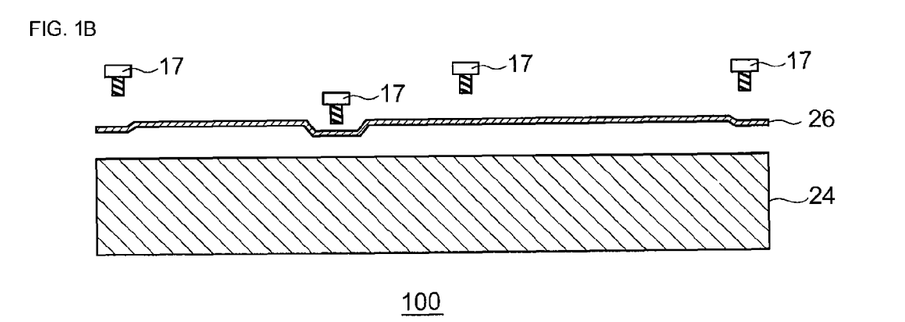
Figure 2:
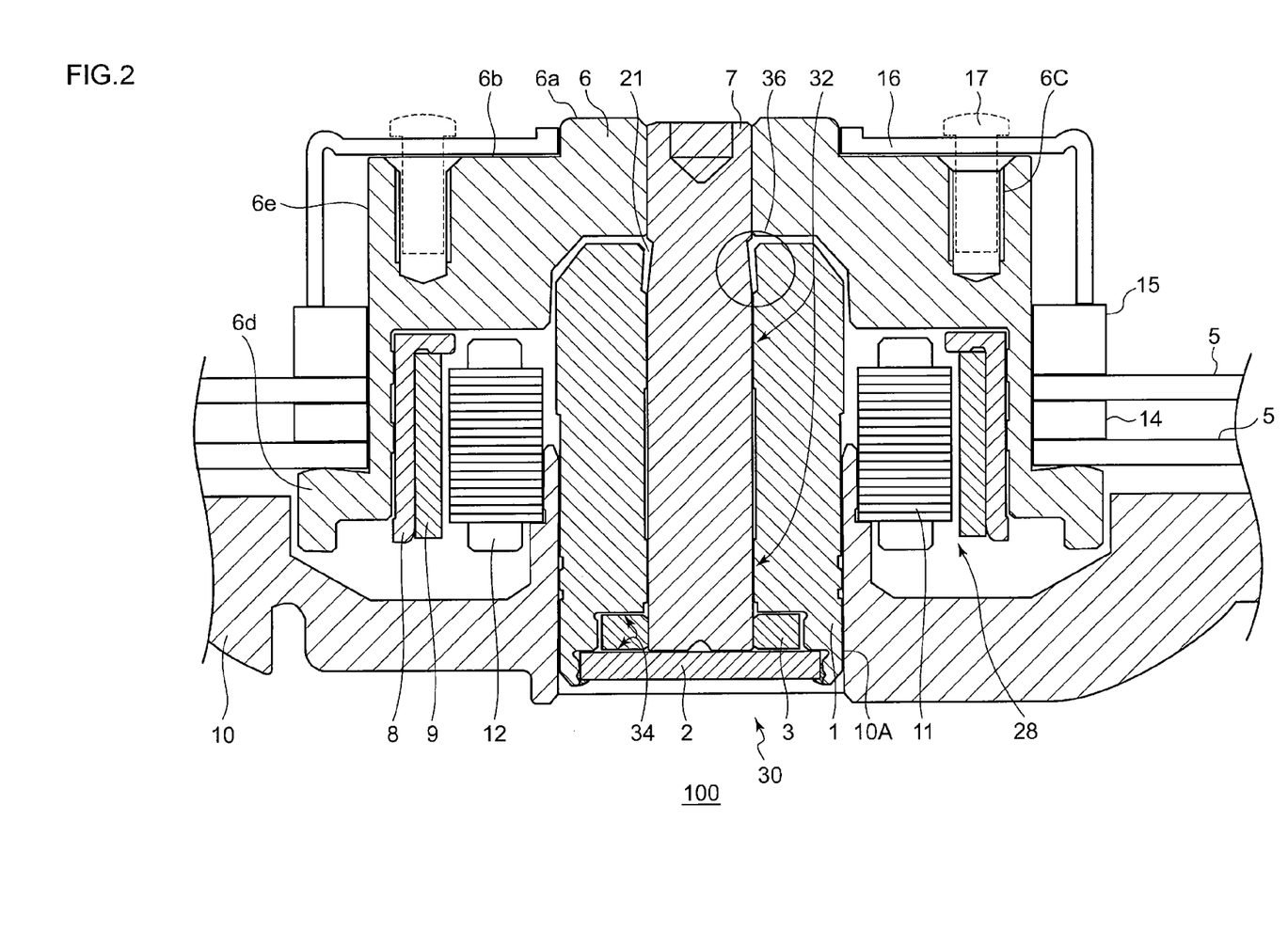
FIG. 2 is a cross-sectional view illustrating part of the disk drive device according to the embodiment.

FIGS. 1A and 1B illustrate a disk drive device 100 according to an embodiment. FIG. 1A is a top view of the disk drive device 100, and FIG. 1B is a side view thereof. FIG. 1A illustrates the state where a top cover 26 is removed. FIG. 2 is a cross-sectional view illustrating part of the disk drive device 100 according to the embodiment. FIG. 2 is a cross-sectional view taken along line A-B in FIG. 1A.

The disk drive device 100 is mounted on a HDD and rotates two 3.5"-recording disks 5, each having a diameter of 95 mm. Each of the two recording disks 5 has a central hole whose diameter is 25 mm and a thickness of 1.27 mm.

The disk drive device 100 comprises: a base member 10; a chassis 22 having a circumferentially surrounding wall portion 24; a hub 6 on which the doughnut-shaped recording disk 5 is mounted; a bearing unit 30 that is arranged on the base member 10 and rotatably supports the hub 6; a spindle drive unit 28 configured to rotationally drive the hub 6; a head drive unit 20; a top cover 26; and a screw 17.

The disk drive device 100 is composed of a fixed body portion that is structured with a non-rotating fixed member, and a rotating body portion that is structured with a rotating member. The fixed body portion is structured so as to include the chassis 22, a stator core 11, a coil 12, a sleeve 1, and a counter plate 2. The rotating body portion is structured so as to include the approximately saucer-shaped hub 6 on which the recording disk 5 is mounted, a shaft 7, a flange 3, a magnet 9, and a yoke 8. The description will be made assuming that the side where the hub 6 is arranged relative to the base member 10 is the upper side.

The chassis 22 has the base member 10, which is a planar area of the concave portion, and the circumferentially surrounding wall portion 24, which is formed so as to be wall-shaped on the outer circumference of the base member 10. The base member 10 has a bearing hole 10A in which the sleeve 1 and the shaft 7 are inserted. The outer circumferential surface of the circumferentially surrounding wall portion 24 is formed into a rectangular shape. The inner circumferential surface of the circumferentially surrounding wall portion 24 is formed by combining the annular portion that surrounds the recording disk 5 with the rectangle portion that surrounds the area on which the head drive unit 20 is mounted. The circumferentially surrounding wall portion 24 functions as a support member for the disk drive device 100 that is supported in the rotational axis direction of the shaft 7. On the other hand, the base member 10 functions as a support member for the disk drive device 100 that is supported in the direction perpendicular to the rotational axis direction of the shaft 7.

The top cover 26, which is illustrated in FIG. 1B, is provided on the upper end of the circumferentially surrounding wall portion 24 and is fixed thereto by screwing the screws 17 with screw holes 24a that are formed on the upper end surface of the circumferentially surrounding wall portion 24. A clean air space is formed by being sealed with the chassis 22 and the top cover 26 that covers the space in the concave portion of the chassis 22. The recording disk 5, which is a magnetic recording medium, the rotating body portion, and the head drive unit 20 are arranged in the clean air space.

The hub 6 is rotatably supported via the bearing unit 30. A shaft hole is formed at the center of the hub 6 and an annular central portion 6a is formed around the shaft hole. Two annular steps are formed on the upper end surface of the hub 6, in which the central portion 6a is located on the highest step. A concave portion 6b, which is concaved one step below from the central portion 6a, is formed annularly on the top end surface. A plurality of screw holes 6c are formed at circumferentially-equal intervals on the top surface of the concave portion 6b. A clamper 16 is arranged on the concave portion 6b such that the central hole of the clamper 16 is fit into the annular step between the central portion 6a and the concave portion 6b. The clamper 16 is fixed to the upper end surface of the hub 6 by screwing the screws 17 for clamper with the screw holes 6c.

The second annular step, which is further concaved from the outer circumferential end of the concave portion 6b, is formed as an outer cylindrical portion 6e and an annular extension portion 6d, which extends outward in the radial direction from the outer cylindrical portion 6e, is formed. The central holes of the two recording disks 5 are fit into the outer cylindrical portion 6e of the hub 6 such that the recording disk 5 on the lower side is mounted on the top surface of the annular extension portion 6d. The diameter of the outer cylindrical portion 6e is 25 mm.

An annular-shaped first spacer 14 is inserted between the two recording disks 5. The clamper 16 presses, via an annular-spaced second spacer 15, the two recording disks 5 and the first spacer 14 against the hub 6 to fix them. The damper 16 is fixed to the top surface of the hub 6 with a plurality of the screws 17 for damper. The hub 6 has a cylinder-shaped partition wall that is sandwiched by the yoke 8 and the two recording disks 5.

The spindle drive unit 28 includes: the stator core 11 that is fixed to the base member 10; the three-phase coil 12 that is wound around the salient pole of the stator core 11; the approximately cylinder-shaped magnet 9; and the yoke 8 that functions as a back yoke of the magnet 9.

The stator core 11 has an annular portion and twelve salient poles that are stretched in the radial direction therefrom. The stator core 11 is formed by laminating eighteen thin electromagnetic steel plates to be integrated by laser welding. The coil 12 is formed with a wire being wound around each salient pole of the stator core 11. The inner circumferential surface of the annular portion of the stator core 11 is adhesively fixed to the base member 10 with a clearance fit.

The magnet 9, facing the tip of the salient pole, is formed of, for example, an Nd—Fe—B (Neodymium-Ferrum-Boron) rare earth material, and on the surface thereof anti-corrosion treatment is performed by electro-deposition coating or spray coating, etc. In addition, the magnet 9 has, for example, twelve driving magnetic poles along the circumferential direction of the inner circumferential portion of the magnet 9. The magnet 9 is fixed to the hub 6 via the yoke 8.

The yoke 8 is formed such that the cross section thereof has an inverted L-shape and is formed of a magnetic material such as iron. The yoke 8 is fixed to the inner circumferential surface of the partition wall of the hub 6 with a combination of adhesion and press fitting. A plurality of convex portions, against which the yoke 8 is pressed when the yoke 8 is being press-fit, are formed on the inner circumferential surface of the partition wall of the hub 6. The space between the inner circumferential surface of the partition wall of the hub 6 and the outer circumferential surface of the yoke 8 is filled with adhesive. This is realized by applying an adequate amount of adhesive to the inner circumferential surface of the partition wall of the hub 6 when the yoke 8 is to be press-fit into the hub 6.

When a three-phase current having an approximately sine-wave shape is conducted through the coil 12 by a predetermined drive circuit, the coil 12 generates a rotational magnetic field in the salient pole of the stator core 11. A rotational driving force is generated by the interaction between the driving magnetic poles of the magnet 9 and the rotational magnetic field, which rotates the rotating body portion. That is, the spindle drive unit 28 rotationally drives the rotating body portion.

The bearing unit 30 is provided on the base member 10. The bearing unit 30 includes the shaft 7, the sleeve 1, the counter plate 2, the flange 3, a radial dynamic pressure groove 32, a thrust dynamic pressure groove 34, and the capillary seal portion 21. The bearing unit 30 is configured such that the shaft 7 and the sleeve 1 rotate relatively to each other.

The shaft 7 functions as a rotational axis and becomes the center of the rotation. The upper end portion of the shaft 7 is fixed to the shaft hole that is formed at the center of the hub 6. The flange 3 is fixed to the lower end portion of the shaft 7 in a press-fit state. The shaft 7 is inserted in the approximately cylinder-shaped sleeve 1. Part of the outer circumferential surface of the sleeve 1 is fixed to the bearing hole 10A at the center of the base member 10.

The counter plate 2 is fixed to the lower end portion on the flange 3 side of the sleeve 1 with adhesive such that the counter plate 2 seals the portion so as for the lubricant not to leak out.

The radial dynamic pressure groove 32 and the thrust dynamic pressure groove 34 function as bearings that rotatably support the hub 6, respectively. The two herringbone-shaped radial dynamic pressure grooves 32 are formed on at least one of the inner circumferential surface of the sleeve 1 and the outer circumferential surface of the shaft 7 in the state where the two radial dynamic pressure grooves 32 are vertically spaced apart from each other, so that radial dynamic pressure is generated in the lubricant. In addition, the herringbone-shaped or spiral-shaped thrust dynamic pressure grooves 34 are formed on both the upper surface and the lower surface of the flange 3.

The dynamic pressure, which is generated in the lubricant 19 by the radial dynamic pressure groove 32 and the thrust dynamic pressure groove 34 while the disk drive device 100 is rotating, supports the rotating body portion in the radial direction and the thrust direction.

The capillary seal portion 21 is formed by the inner circumferential surface of the sleeve 1 and the outer circumferential surface of the shaft 7, and formed such that the gap between the inner circumferential surface of the sleeve 1 and the outer circumferential surface of the shaft 7 gradually expands toward the hub 6 side, which is located above. Lubricant, such as oil, is injected into the spaces that are formed by: the radial dynamic pressure groove 32 and the surface facing the groove 32; the thrust dynamic pressure groove 34 and the surface facing the groove 34; and the capillary seal portion 21. The gas-liquid interface where the lubricant is in contact with ambient air is set to the middle position of the capillary seal portion 21. In the capillary seal portion 21, a leak of the lubricant can be prevented by a capillary force. The capillary seal portion 21 will be described further specifically.

Figure 3:
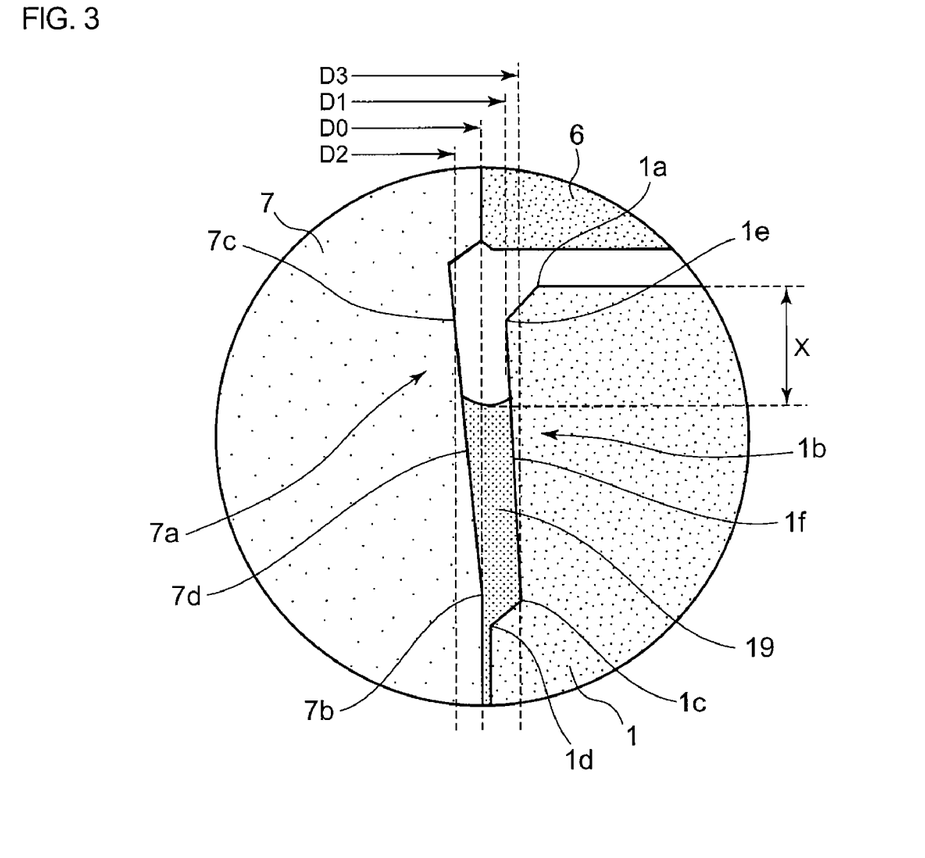
FIG. 3 is a view illustrating a capillary seal portion according to the embodiment.

FIG. 3 illustrates the capillary seal portion 21 according to the embodiment. FIG. 3 is an enlarged view of the part that is enclosed by the circle 36 illustrated in FIG. 2. The sleeve concave portion 1b is formed on the inner circumferential surface at the end portion on the hub 6 side of the sleeve 1 such that the inner circumferential surface of the sleeve 1 is concaved. The shaft concave portion 7a is formed on the outer circumferential surface of the shaft 7, the outer circumferential surface facing the sleeve concave portion 1b, so that the outer circumferential surface of the shaft is concaved.

The capillary seal portion 21 is formed by the sleeve concave portion 1b and the shaft concave portion 7a, and is formed such that the gap between the sleeve concave portion 1b and the shaft concave portion 7a expands toward the hub 6 side of the sleeve 1.

The shaft concave portion 7a is formed such that the outer circumferential surface 7d of the shaft 7 is reduced in diameter going from the tilt starting end 7b on the base member 10 side of the shaft concave portion 7a toward the hub 6 side, which is located above. The most concave place of the shaft concave portion 7a is located, in the axial direction, above the open end portion 1a of the sleeve 1. In addition, the tilt starting end 7b on the base member 10 side of the shaft concave portion 7a and the most concave inner circumference 1c of the sleeve concave portion 1b may be located at the same position in the axial direction.

The sleeve concave portion 1b is formed such that the inner circumferential surface of the sleeve 1 is dramatically increased in diameter going from the tilt starting position 1d on the base member 10 side of the sleeve concave portion 1b toward the hub 6 side, which is located above, and such that the inner circumferential surface 1f of the sleeve 1 is gradually reduced in diameter going from the most concave inner circumference 1c of the sleeve concave portion 1b toward the tilt starting end 1e on the hub 6 side of the sleeve concave portion 1b.

The diameter of the outer circumference at the tilt starting end 7b on the base member 10 side of the shaft concave portion 7a is assumed to be D0. The diameter of the inner circumference at the tilt starting end on the hub 6 side of the sleeve concave portion 1b is assumed to be D1. The diameter of the facing outer circumference 7c of the shaft concave portion 7a, the facing outer circumference 7c facing, in the radial direction, the inner circumference at the tilt starting end 1e on the hub 6 side of the sleeve concave portion 1b, is assumed to be D2. The diameter of the most concave inner circumference 1c of the sleeve concave portion 1b is assumed to be D3.

Because the gap between the inner circumferential surface of the sleeve 1 and the outer circumferential surface of the shaft 7, in an area where dynamic pressure is generated, is very narrower than that between the sleeve 1 and the shaft 7 in the capillary seal portion 21, the former gap can be disregarded. Accordingly, the difference between the diameters D0 and D3 represents the size by which the sleeve concave portion 1b is concaved.

Figure 4:
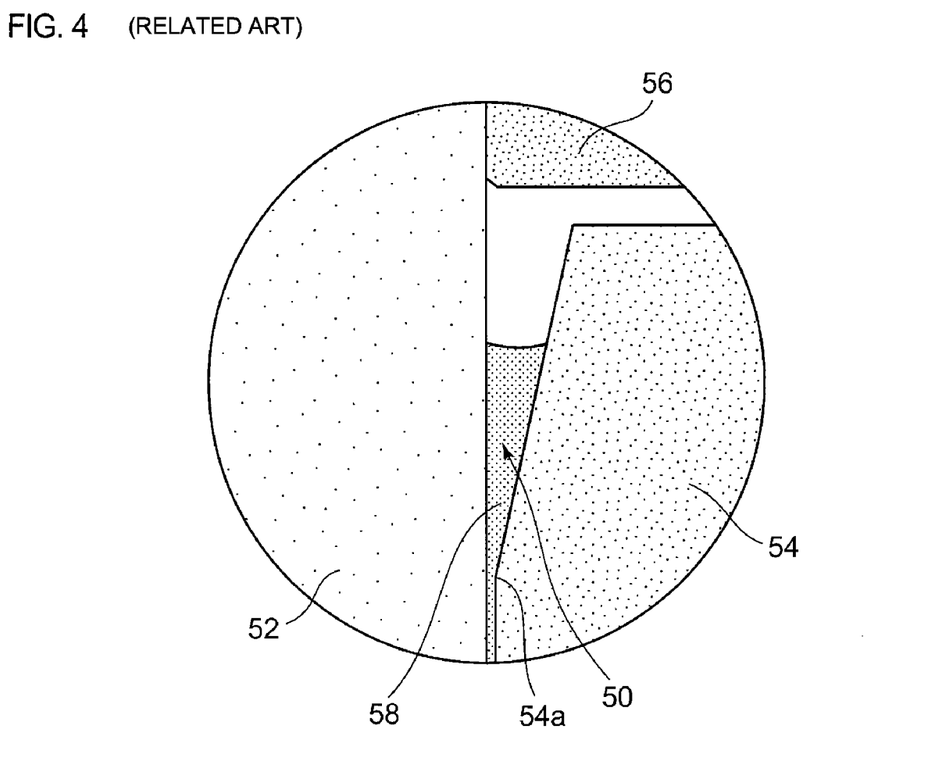
FIG. 4 is a view illustrating a capillary seal portion according to a comparative technique.

Herein, the problem the present inventor has recognized will be described. FIG. 4 illustrates a capillary seal portion 50 according to a comparative technique. The capillary seal portion 50 is formed by the outer circumferential surface of a shaft 52 and the inner circumferential surface of a sleeve 54, and is formed such that the inner circumferential surface of the sleeve 54 is increased in diameter going from a tilt starting end 54a of the sleeve 54 toward a hub 56 side, which is located above. The outer circumferential surface of the shaft 52, which forms the capillary seal portion 50, is a cylindrical surface.

Figure 5:
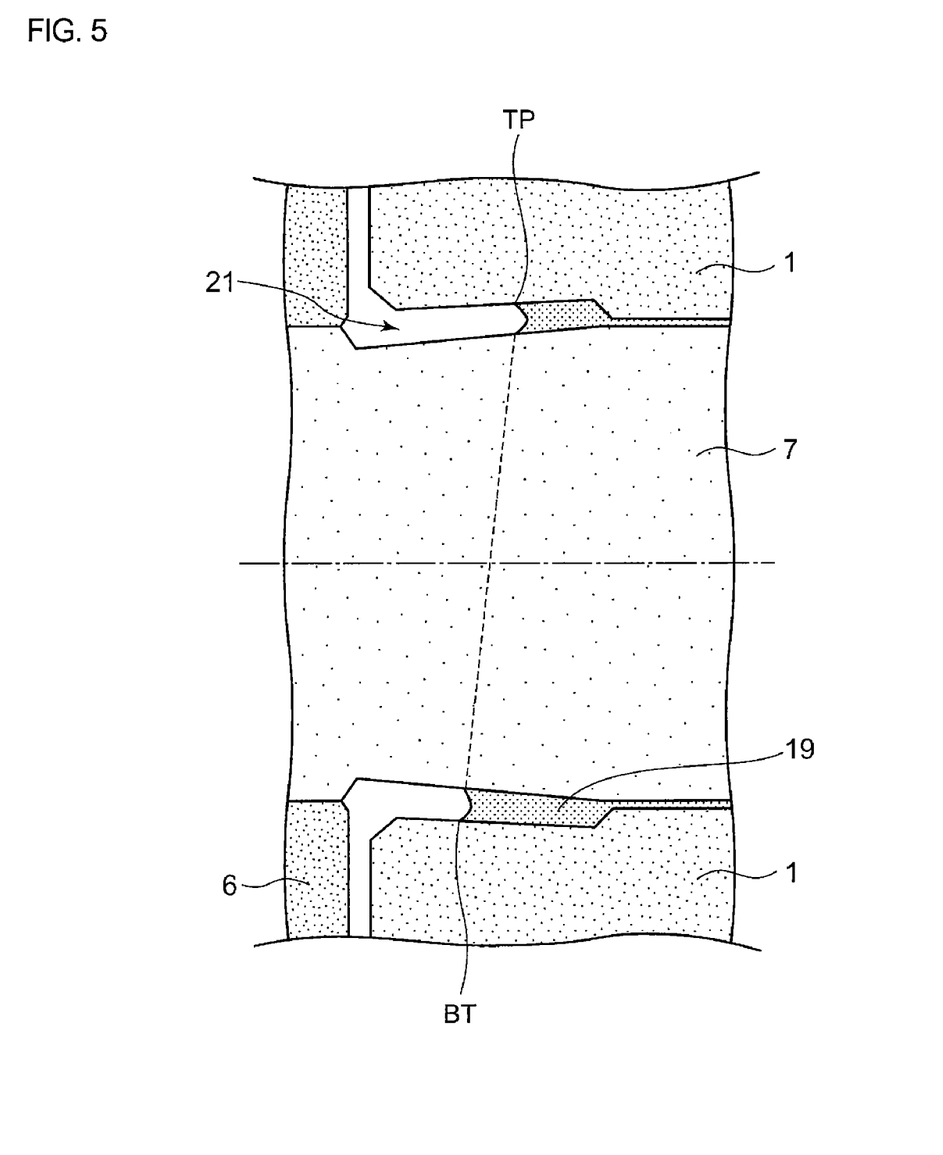
FIG. 5 is a view illustrating the capillary seal portion according to the embodiment when the shaft is maintained in a horizontal state.
Figure 6:
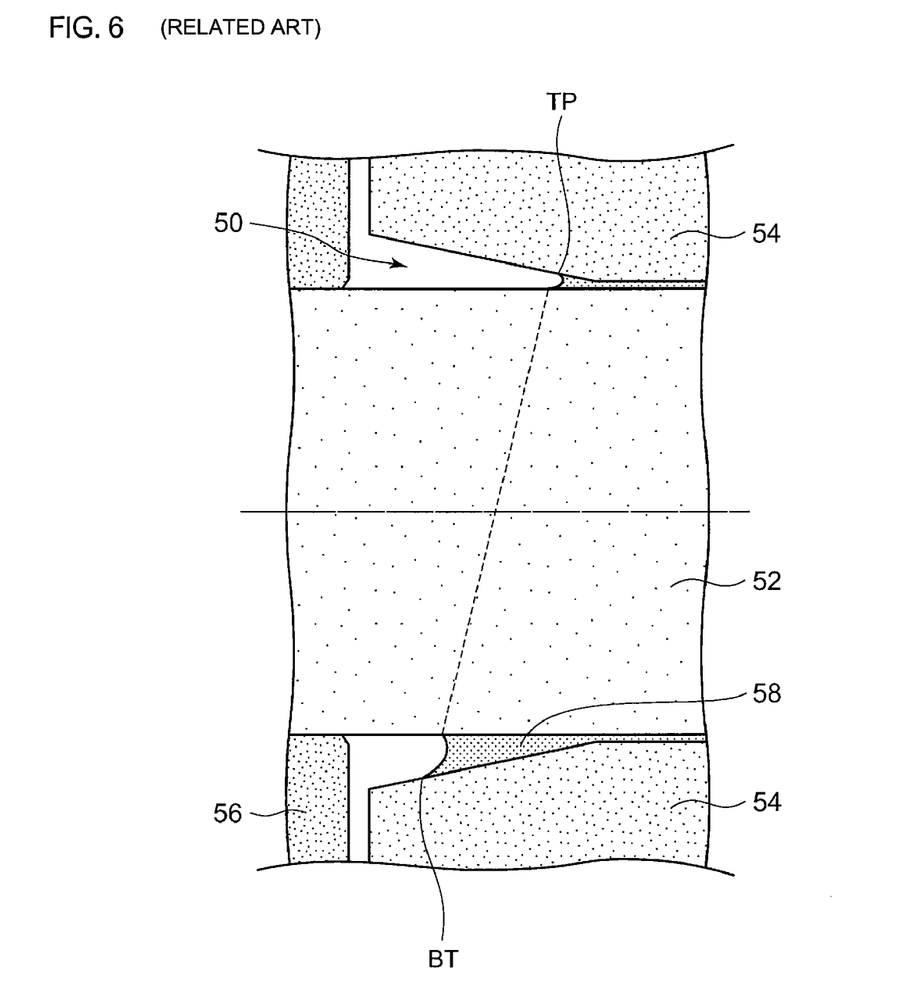
FIG. 6 is a view illustrating the capillary seal portion according to the comparative technique when the shaft is maintained in a horizontal state.

FIG. 5 illustrates the capillary seal portion 21 according to the embodiment when the shaft 7 is maintained in a horizontal state. FIG. 6 illustrates the capillary seal portion 50 according to the comparative technique when the shaft 52 is maintained in a horizontal state.

Herein, when the shaft 52 is maintained in a horizontal state, lubricant 58 in the capillary seal portion 50 receives, due to gravity, a force that is directed toward the opening side, which is located below in FIG. 6. As illustrated in FIG. 6, at the lowest position of the gas-liquid interface of the lubricant 58, the gas-liquid interface being in contact with the sleeve 54 (hereinafter, the lowest position of the gas-liquid interface is referred to as "BT"), the pressure having a magnitude corresponding to the difference in height between the highest position of the gas-liquid interface (hereinafter, the highest position of the gas-liquid interface is referred to as "TP") and BT, the pressure being directed outward in the axial direction, is applied. Due to the pressure Pd, BT is transferred outward in the axial direction (to the left direction in FIG. 6). Because the gas-liquid interface is transferred, a capillary force occurs in the left direction at both BT and TP. As a result, the gas-liquid interface is tilted to the position where the balance of the capillary force is balanced with Pd, and then is stabilized. That is, the difference in height between TP and BT is large because the inner diameter of the sleeve 54 at the part where the sleeve 54 is in contact with the gas-liquid interface of the lubricant 58, as illustrated in FIG. 6. Because the difference in height between TP and BT is large, BT and TP of the lubricant 58 is tilted, causing BT of the lubricant 58 to be brought close to the opening of the capillary seal portion 21. In addition, because the inner circumferential surface of the sleeve 54, which forms the capillary seal portion 50, is tilted outward in the radial direction, the lubricant 58 is likely to leak to the outside of the bearing, i.e., to leak outwards in the radial direction due to the centrifugal force while rotating.

On the other hand, as illustrated in FIG. 5, the difference in height between TP and BT is smaller than the case illustrated in FIG. 6, because the inner diameter of the sleeve concave portion 1b at the part where the sleeve concave portion 1b is in contact with the gas-liquid interface of the lubricant 19. Because the difference in height between TP and BT is small, Pd becomes small. Because Pd is small, the lubricant 19 can be maintained at an angle close to perpendicularity. That is, TP and BT of the lubricant 19 can be maintained at an angle closer to perpendicularity than the slope of the interface of the lubricant 58 illustrated in FIG. 6.

Referring back to FIG. 3, in the disk drive device 100 according to the embodiment, the diameter D2 is made smaller than the diameter D0 in order to make the difference in height between TP and BT of the gas-liquid interface of the lubricant 19 small. With this, the outer circumferential surface of the shaft 7, which forms the capillary seal portion 21, is formed so as to be concaved, making the inner diameter of the gap that forms the capillary seal portion 21 small. Accordingly, the inner diameter of the sleeve concave portion 1b becomes small, allowing for the difference in height between TP and BT to be small. Further, when the shaft 7 is maintained in a horizontal state, a leak of the lubricant 19 outward in the radial direction can be reduced by tilting the capillary seal portion 21 itself inward in the radial direction toward the opening.

Subsequently, a loss in the amount of the lubricant 19 by evaporation is made small by reducing the contact area between the lubricant 19 and air. For this purpose, the area of the opening is reduced by making the diameter D1 of the sleeve concave portion 1b small. That is, the diameter D1 is made smaller than the diameter D3. As a result, a loss in the amount of the lubricant 19 by evaporation can be reduced.

Further, in order to provide the durability for the loss in the amount of the lubricant 19 by evaporation, etc., it is needed that a predetermined volume of the lubricant 19 is secured. For this purpose, the sleeve 1 is made concaved by making the diameter D3 larger than the diameter D0. Further, the capillary seal portion 21 is formed such that the difference between the diameter D3 and the diameter D0 is larger than that between the diameter D0 and the diameter D2. With this, in the capillary seal portion 21 in which both surfaces of the sleeve 1 and the shaft 7 are formed so as to be concaved, the sleeve 1 is more concave than the shaft 7, allowing for the necessary volume of the lubricant 19 to be secured in the capillary seal portion 21.

If the amount of the lubricant 19 that has been filled into the bearing unit 30 is small, the lifetime of the bearing unit 30 for a loss in the amount of the lubricant 19 by evaporation, etc., will be shortened. Accordingly, the amount of the lubricant 19 in the capillary seal portion 21 is directly confirmed when the bearing unit 30 is produced. This confirmation can be easily performed by using a laser range finder. This confirmation is performed by reflecting, from upward in FIG. 3, laser beam onto the gas-liquid interface of the lubricant 19 in the state where the hub 6 is yet to be mounted while being assembled. At the time, the laser beam is intercepted depending on the position of the tilt starting end 1e, causing an obstacle for measurement. In response to this, the capillary seal portion 21 is formed such that the diameter D0 becomes the average value of the diameter D1 and the diameter D2. As a result, the amount of the lubricant 19 in the capillary seal portion 21 can be directly confirmed through the laser beam.

Subsequently, when the rotating speed is increased, there is the fear that the lubricant 19 may be dispersed because a centrifugal force is applied to the lubricant 19 due to the rotation. In response to this, the inner circumferential surface if between the inner circumference at the tilt starting end 1e on the hub 6 side of the sleeve concave portion 1b and the most concave inner circumference 1c of the sleeve concave portion 1b is tilted inward relative to the rotational axis. That is, the diameter D3 is made larger than the diameter D1 and the outer circumferential surface of the shaft 7 is formed so as to be reduced in diameter going from the most concave inner circumference 1c of the sleeve concave portion 1b toward the tilt starting end 1e on the hub 6 side of the sleeve concave portion 1b. With this, when the shaft 7 is maintained in a horizontal state, a leak of the lubricant 19 in the capillary seal portion 21 to the outside of the bearing unit 30, i.e., a leak thereof outward in the radial direction can be reduced.

When the inner circumferential surface if between the inner circumference at the tilt starting end 1e on the hub 6 side of the sleeve concave portion 1b and the most concave inner circumference 1c of the sleeve concave portion 1b is tilted at an angle greater than or equal to 0.5°, the effect of preventing the lubricant 19 from being dispersed due to a centrifugal force has been confirmed. Further, when the inner circumferential surface if is tilted at an angle smaller than or equal to 3°, it has been confirmed that the sleeve concave portion 1b is easily processed. Accordingly, it is desirable that the circumferential surface 1f between the inner circumference at the tilt starting end 1e on the hub 6 side of the sleeve concave portion 1b and the most concave inner circumference 1c of the sleeve concave portion 1b is formed so as to be tilted at an angle within a range of 0.5° to 3° relative to the rotational axis.

Subsequently, as the gap is narrower, the lubricant 19 receives larger pressure outward in the axial direction. With the gap, which forms the capillary seal portion 21, gradually extending toward upward in the axial direction, the capillary seal portion 21 has the effect of preventing a leak. The outer circumferential surface of the shaft concave portion 7a is formed so as to be tilted at an angle larger than the angle at which the inner circumferential surface of the sleeve concave portion 1b tilted, by at least 1° or more in order to secure the effect of preventing a leak. Further, it has been confirmed that, when the outer circumferential surface of the shaft concave portion 7a is tilted at an angle smaller than or equal to 8°, the shaft concave portion 7s is easily processed. Accordingly, it is desirable that the outer circumferential surface 7d between the outer circumference at the tilt starting end 7b of the shaft concave portion 7a and the facing outer circumference 7c is formed so as to be tilted at an angle within a range of 4° to 8° relative to the rotational axis, in terms of securing a capillary force and being easily processed.

In addition, there is the challenge that it is desirable to avoid that the gas-liquid interface of the lubricant 19 is greatly tilted when the shaft 7 is maintained in a horizontal state. In response to this, the surface roughness of the outer circumferential surface 7d of the shaft concave portion 7a is formed so as to be larger than the average surface roughness of the outer circumferential surface of the shaft 7 on which the radial dynamic pressure groove 32 is provided, or of the outer circumferential surface of the shaft 7 facing the inner circumferential surface of the sleeve 1 on which the radial dynamic pressure groove 32 is provided. That is, the outer circumferential surface 7d of the shaft concave portion 7a is formed so as to be rougher than the outer circumferential surface of the shaft 7 in the space where the radial dynamic pressure groove 32 is provided. When the surface roughness of the shaft concave portion 7a is large, the effective surface area becomes large and therefore the contact angle of the lubricant 19 becomes large, thereby allowing for the surface tension, which is applied to the lubricant 19, to be large. When the surface tension becomes large, the capillary force also becomes large, thereby allowing for the gas-liquid interface of the lubricant 19 to be tilted at a small angle when the shaft 7 is maintained in a horizontal state. It is noted that "surface roughness is large" means that the surface is rough and "surface roughness is small" means that the surface is smooth. Alternatively, the surface roughness of the inner circumferential surface 1f of the sleeve concave portion 1b may be formed so as to be larger than the surface roughness of the inner circumferential surface of the sleeve 1 on which the radial dynamic pressure groove 32 is provided, or larger than the surface roughness of the inner circumferential surface of the sleeve 1 facing the outer circumferential surface of the shaft 7 on which the radial dynamic pressure groove is formed.

Subsequently, the inner circumferential surface at the upper end portion of the sleeve 1 is tapered so as to be increased in diameter going from the tilt starting end 1e on the hub 6 side of the sleeve concave portion 1b toward the hub 6 side. With this, a leak of the lubricant 19 can be prevented by providing a steep taper on the upper end portion side in addition to the sleeve concave portion 1b. In addition, when inserting the shaft 7 into the sleeve 1, powder produced by wear is sometimes created by the contact of the shaft 7 with the end portion of the sleeve concave portion 1b. There is the challenge that entering of the powder produced by wear into the bearing unit 30 causes the bearing to be burned, etc. Contact of the shaft 7 with the end portion of the sleeve concave portion 1b during the assembly can be reduced by providing a taper at the upper end portion of the sleeve 1.

Subsequently, there is the probability that, when using a dynamic bearing in the state where the shaft 7 thereof is maintained in a horizontal state, air may be sucked into the gap of the bearing that has been filled with the lubricant 19, thereby not allowing for sufficient dynamic pressure to be exhibited. In response to this, when the disk drive device 100 has been produced, the lubricant 19 is made to cover at least the most concave inner circumference 1c of the sleeve concave portion 1b when the shaft 7 is maintained in a horizontal state. For example, when the axial direction position of the most concave inner circumference 1c of the sleeve concave portion 1b is the same as that of the tilt starting end 7b on the base member 10 side of the shaft concave portion 7a, and when there is an adequate amount of the lubricant 19, the most concave inner circumference 1c of the sleeve concave portion 1b is covered with the lubricant 19 even if the lubricant 19 is tilted when the shaft 7 is maintained in a horizontal state. With this, when using a dynamic bearing in the state where the shaft 7 thereof is maintained in a horizontal state, the probability of sucking air into the gap of the dynamic bearing can be reduced.

Subsequently, there is a challenge that, if the gas-liquid interface of the lubricant 19 in the capillary seal portion 21 is close to the open end portion 1a of the sleeve concave portion 1b, the lubricant 19 may be easily dispersed when an impact is applied to the disk drive device 100. In the disk drive device 100 according to the embodiment, it has been confirmed that, if the capillary seal portion 21 is filled with the lubricant 19 to the position that the gas-liquid interface of the lubricant 19 in the capillary seal portion 21 is apart from the open end portion 1a of the sleeve concave portion 1b by 0.4 mm or more when the shaft 7 is maintained in a vertical state, the lubricant 19 is not dispersed even if an impact of 450 G (gravity) or less is applied thereto for 2 ms (millisecond) when the shaft 7 is maintained in a horizontal state. Accordingly, the gas-liquid interface of the lubricant in the capillary seal portion 21 is made to be apart, in the axial direction, from the open end surface on the hub 6 side of the sleeve concave portion 1b by 0.4 mm or more in the state where the disk drive device stands still with the shaft 7 being maintained vertically. That is, the distance X in the axial direction between the gas-liquid interface of the lubricant 19 in the capillary seal portion 21 and the open end portion 1a of the sleeve concave portion 1b is made to be 0.4 mm or more in the state where the disk drive device 100 stands still with the shaft 7 being maintained vertically. With this, the challenge that the lubricant 19 may be easily dispersed can be reduced.

Injection of the lubricant 19 into the capillary seal portion 21 can be efficiently performed if a lubricant injection nozzle having a diameter of at least 0.3 mm can be inserted. The lubricant 19 is injected by inserting a lubricant injection nozzle into the capillary seal portion 21 in the state where the hub 6 is yet to be mounted. In response to this, the diameter D2 may be made smaller than the diameter D0 by 0.3 mm or more. As a result, injection of the lubricant 19 can be easily performed.

It has been confirmed that, when the diameter of the opening of the capillary seal portion 21 is smaller than or equal to 1 mm, the opening is practically available for a loss of the lubricant 19 by evaporation. Accordingly, the difference between the diameter D2 and the diameter D1 may be made to be 1 mm or smaller.

Subsequently, in response to the challenge that the lubricant 19 may be dispersed by a centrifugal force due to rotation with increased rotating speed, an annular-shaped cover member (not illustrated) may be provided at the end portion 1a of the sleeve concave portion 1b. That is, the cover member covers the gas-liquid interface of the lubricant in the capillary seal portion 21 at the end portion 1a on the hub 6 side of the sleeve concave portion 1b. For example, the cover member is arranged in the opening of the capillary seal portion 21 and is fixed to the end portion 1a of the sleeve concave portion 1b. Dispersion of the lubricant 19 due to a centrifugal force can be prevented by mounting a cover member.

Subsequently, there is the challenge that, if the sleeve concave portion 1b is integrated with the sleeve 1, processing of them will take a long time. In response to this, the sleeve concave portion 1b may be separate from the main body of the sleeve 1 in which the radial dynamic pressure groove 32 is formed. For example, the sleeve concave portion 1b may be formed into a doughnut shape to be fixed to the main body of the sleeve 1 after the sleeve concave portion 1b has been processed. With this, the challenge of taking a long time for processing can be reduced.

There is the challenge of reducing the weight of the disk drive device 100. In response to this, the sleeve concave portion 1b may be formed of plastic. As a result, the challenge of reducing the weight can be reduced.

Subsequently, there is the challenge that the capillary force in the capillary seal portion 21 is needed to be further increased in order to make the lubricant 19 be tilted at a small angle when the shaft 7 is maintained in a horizontal state. In response to this, at least one of the sleeve concave portion 1b and the shaft concave portion 7a may be subjected to a hydrophilic treatment. Herein, the hydrophilic treatment means a treatment in which the surface of a member is modified such that the contact angle of the surface to a liquid is made small. The contact angle of the sleeve concave portion 1b or the shaft concave portion 7a becomes small by being subjected to a hydrophilic treatment, thereby allowing for the capillary force in the capillary seal portion 21 to be large.

As a hydrophilic treatment, various techniques can be employed. For example, hydrophilic treatments by titanium coating, glass coating, silica coating, organic-inorganic composite ceramic coating, and UV irradiation, are preferred in terms of easy work and a sufficient hydrophilic effect. Among hydrophilic treatments, a treatment in which the contact angle is made to be smaller than or equal to 10° is particularly called a superhydrophilic treatment. The surface of at least one of the sleeve concave portion 1b and the shaft concave portion 7a may be subjected to a hydrophilic treatment. As a result, it is preferable in terms of a further increased centrifugal force.

Subsequently, there is the challenge that the lubricant 19 may be dispersed due to an impact, etc., occurring when a fluid bearing is being mounted in the state where the shaft 7 thereof is maintained in a horizontal state. In response to this, the present inventor has found that the impact, which is applied to the disk drive device 100 when the disk drive device 100 is being mounted, is smaller than or equal to 450 G for a short period of 2 ms. The disk drive device 100 is configured such that, even if an acceleration of 450 G is applied thereto for a period of 2 ms when the axial direction of the shaft 7 is maintained in a horizontal state, the lubricant 19 in the capillary seal portion 21 is held. As a result, the challenge that, when the disk drive device 100 is used in the state where the shaft 7 is maintained in a horizontal state, the lubricant 19 may be dispersed due to an impact occurring when the disk drive device 100 is being mounted, can be reduced. Dispersion of the lubricant 19 can be confirmed by subjecting the disk drive device 100 to an impact test in which an acceleration of 450 G is applied for a period of 2 ms.

The present invention has been described based on the preferred embodiments, which are only intended to illustrate the principle and applications of the invention, and it is needless to say that a variety of modifications and variations in arrangement may be made to the embodiments within the range not departing from the spirit of the invention specified in appended claims.

For example, in each aforementioned embodiment, a so-called outer-rotor disk drive device 100 has been described, in which the magnet 9 is located outside in the radial direction of the stator core 11; however, the disk drive device is not limited thereto. A so-called inner-rotor disk drive device may be employed, in which, for example, a magnet is located inside a stator core.

In the disk drive device 100 according to the embodiments, the structure in which the sleeve 1 is fixed to the base member 10 and the shaft 7 rotates relative to the sleeve 1, has been described; however, a shaft-fixed disk drive device may be employed, in which, for example, a shaft is fixed to a base member and a sleeve, together with a hub, rotates relative to the shaft.

What is claimed is:

1. A disk drive device comprising:
a base member;
a bearing unit that is provided on the base member and is configured such that a shaft and a sleeve in which the shaft is inserted rotate relatively to each other; and
a hub that is supported via the bearing unit, wherein the bearing unit includes:
the shaft;
a radial dynamic pressure groove that is provided on at least one of an inner circumferential surface of the sleeve and an outer circumferential surface of the shaft in order to generate radial dynamic pressure in lubricant;
a sleeve concave portion that is formed on the inner circumferential surface at an end portion on a hub side of the sleeve; and a capillary seal portion that is formed by the sleeve concave portion and a shaft concave portion formed on the outer circumferential surface of the shaft, the outer circumferential surface of the shaft facing the sleeve concave portion, and a gap between the sleeve concave portion and the shaft concave portion is formed so as to expand toward the hub side of the sleeve, and wherein, assuming that: an outer circumferential diameter at a tilt starting end on a base member side of the shaft concave portion is D0; an inner circumferential diameter at the tilt starting end on the hub side of the sleeve concave portion is D1; a facing outer circumferential diameter of the shaft concave portion, which faces, in a radial direction, an inner circumference at the tilt starting end of the sleeve concave portion, is D2; and a diameter of a most concave inner circumference of the sleeve concave portion is D3, D2 is smaller than D0, D3 is larger than D1, and the difference between D3 and D0 is larger than that between D0 and D2.

2. The disk drive device according to claim 1, wherein D0 is the average value of D1 and D2.

3. The disk drive device according to claim 1, wherein an inner circumferential surface between an inner circumference at the tilt starting end of the sleeve concave portion and the most concave inner circumference of the sleeve concave portion is tilted inward relative to a rotational axis.

4. The disk drive device according to claim 3, wherein the inner circumferential surface between the inner circumference at the tilt starting end of the sleeve concave portion and the most concave inner circumference of the sleeve concave portion is tilted at an angle within a range of 0.5° to 3° relative to the rotational axis.

5. The disk drive device according to claim 1, wherein an outer circumferential surface between an outer circumference at the tilt starting end of the shaft concave portion and a facing outer circumference is tilted at an angle within a range of 4° to 8° relative to a rotational axis.

6. The disk drive device according to claim 1, wherein the radial dynamic pressure groove is provided on the outer circumferential surface of the shaft, and wherein a surface roughness of the outer circumferential surface of the shaft concave portion is larger than a surface roughness of the outer circumferential surface of the shaft on which the radial dynamic pressure groove is provided, or wherein the radial dynamic pressure groove is provided on the inner circumferential surface of the sleeve, and the surface roughness of the outer circumferential surface of the shaft concave portion is larger than the surface roughness of the outer circumferential surface of the shaft facing the inner circumferential surface of the sleeve on which the radial dynamic pressure groove is provided.

7. The disk drive device according to claim 1, wherein the inner circumferential surface of the sleeve is tapered so as to be increased in diameter going from the tilt starting end on the hub side of the sleeve concave portion toward the hub side.

8. The disk drive device according to claim 1, wherein, when the shaft is maintained in a horizontal state, the lubricant covers at least the most concave inner circumference of the sleeve concave portion.

9. The disk drive device according to claim 1, wherein, when the shaft is maintained in a vertical state, a gas-liquid interface of the lubricant in the capillary seal portion is located apart from an end surface on a hub side of the sleeve concave portion by 0.4 mm or more.

10. The disk drive device according to claim 1, wherein D2 is smaller than D0 by 0.3 mm or more.

11. The disk drive device according to claim 1, wherein the sleeve concave portion is separate from a main body of the sleeve in which the radial dynamic pressure groove is formed.

12. The disk drive device according to claim 11, wherein the sleeve concave portion is formed of plastic.

13. The disk drive device according to claim 1, wherein at least one of the sleeve concave portion and the shaft concave portion is subjected to a hydrophilic treatment.

14. The disk drive device according to claim 1, wherein the disk drive device is configured such that, even if an acceleration of 450 G is applied thereto for a period of 2 ms when an axial direction of the shaft is maintained in a horizontal state, the lubricant in the capillary seal portion is held.

* * * * *